United States Patent
Streete et al.

(10) Patent No.: US 10,291,616 B1
(45) Date of Patent: May 14, 2019

(54) RESOURCE AUTHORIZATION SYSTEM AND METHOD

(71) Applicant: VCE Company, LLC, Richardson, TX (US)

(72) Inventors: Jonathan P. Streete, San Jose, CA (US); Joshua L. Bonczkowski, Apex, NC (US); Nicholas A. Hansen, Willow Spring, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 49 days.

(21) Appl. No.: 14/575,716

(22) Filed: Dec. 18, 2014

(51) Int. Cl.
H04L 29/06 (2006.01)
(52) U.S. Cl.
CPC .............. *H04L 63/10* (2013.01); *H04L 63/08* (2013.01)
(58) Field of Classification Search
CPC ......... H04L 63/08; H04L 63/10; G06F 21/62; G06F 21/6218
USPC ........................................ 726/4, 5; 709/229
See application file for complete search history.

(56) References Cited

U.S. PATENT DOCUMENTS

| | | | | |
|---|---|---|---|---|
| 5,477,538 A * | 12/1995 | Huenlich | ............ | H04L 12/5602 370/395.31 |
| 7,024,556 B1 * | 4/2006 | Hadjinikitas | ....... | H04L 63/0815 709/225 |
| 9,118,538 B1 * | 8/2015 | Lekkalapudi | ......... | H04L 67/025 |
| 2003/0225827 A1 * | 12/2003 | Andersen | ................ | H04L 29/06 709/203 |
| 2004/0088422 A1 * | 5/2004 | Flynn | ...................... | G06F 9/468 709/229 |
| 2004/0130142 A1 * | 7/2004 | Sarbaz | ................. | G06Q 20/045 283/74 |
| 2004/0199794 A1 * | 10/2004 | Philips | .................... | G06F 21/41 726/8 |
| 2006/0062225 A1 * | 3/2006 | Li | ......................... | H04L 49/355 370/396 |
| 2007/0156693 A1 * | 7/2007 | Soin | ...................... | G06F 21/604 |
| 2011/0154455 A1 * | 6/2011 | Nanjangudu | ............. | H04L 9/32 726/6 |
| 2012/0084570 A1 * | 4/2012 | Kuzin | ..................... | G06F 21/41 713/182 |

(Continued)

OTHER PUBLICATIONS

Coates, "A Trust System Architecture for SCADA Network Security", Jan. 2010, IEEE, vol. 25, pp. 158-169 (Year: 2010).*

*Primary Examiner* — Taghi T Arani
*Assistant Examiner* — Gregory A Lane
(74) *Attorney, Agent, or Firm* — Polsinelli PC (57) ABSTRACT

A resource authorization system includes an authorization routing service that is executed on a computing device to authenticate a client to form a client login session, and to receive, from the client, a request to establish a connection to one or more of the resources of a distributed computing system. The authorization routing service then obtains a list of the resources associated with the client login session in which the list of resources includes those that the client is authorized to communicate with. When the requested resource is included in the list of resources, the authorization routing service authenticates the requested resources to form a resource login session, and establish the connection by communicatively coupling the client login session and the resource login session. The resource login session is established independently of the client login session.

15 Claims, 8 Drawing Sheets

(56) References Cited

U.S. PATENT DOCUMENTS

| | | | |
|---|---|---|---|
| 2013/0080520 A1* | 3/2013 | Kiukkonen | G06Q 50/01 709/204 |
| 2014/0281523 A1* | 9/2014 | Golino | H04L 63/0428 713/168 |
| 2016/0134616 A1* | 5/2016 | Koushik | H04L 63/0807 726/9 |

* cited by examiner

FIG. 7

RESOURCE AUTHORIZATION SYSTEM AND METHOD

TECHNICAL FIELD

Aspects of the present disclosure relate to computing devices and, in particular, to a resource authorization system and method.

BACKGROUND

Computing environments used by enterprises often include numerous computing devices operated by multiple personnel. In many cases, certain computing devices may include sensitive data or may be used to provide some form of control over how a computing environment and/or other system in the enterprise operates. In such cases, an authentication mechanism may be implemented on these sensitive computing devices to ensure that only certain personnel are able to view and/or manipulate their operation.

SUMMARY

According to one aspect of the present disclosure, a resource authorization system includes an authorization routing service that is executed on a computing device. The authorization routing service authenticates a client to form a client login session, and receives, from the client, a request to establish a connection to one or more of the resources of a distributed computing system. The authorization routing service obtains a list of the resources associated with the client login session in which the list of resources includes those that the client is authorized to communicate with. When the requested resource is included in the list of resources, the authorization routing service authenticates the requested resources to form a resource login session, and establishes a connection by communicatively coupling the client login session and the resource login session. The resource login session is established independently of the client login session.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Embodiments of the present disclosure provide a system for authorizing communication sessions between certain resources of a distributed computing system and clients that are authorized to manage those resources. While distributed computing systems have provided a relatively efficient and flexible platform for executing large-scale applications using resources that may be added, moved, and deleted on demand, efficient management of these resources has been relatively difficult to obtain due in large part to security mechanisms, which are often required for the secure operation of the distributed computing system. The authorization system as described herein provides a mechanism to grant administrators access to one or more controlled subsets of managed resources in a distributed computing system without sharing the authentication credentials of the resources with the administrators, thereby enhancing the likelihood that secure practices may be followed, as well as other benefits, such as allowing credentials rotation at any frequency desired by a chief information security officer (CISO).

Managing a distributed computing system can be difficult due in large part to the scale and variety of its resources. The resources of a distributed computing system may include hardware resources (e.g., hosts, physical servers, storage arrays, networking switches, load balancers, etc.), virtual machines executed on the hosts, as well as the various application services executed by these resources. Conventional management techniques for distributed computing systems has often involved individual authentication of each of multiple resources. The authentication of resources generally refers to a restrictive act of only allowing access to the resources based upon successful entry of certain authentication parameters (e.g., passcodes, passwords, etc.) by a user. Nevertheless, authentication of multiple resources often requires sharing of authentication credentials for each resource with all administrators who manage the distributed computing system's operation, which can be an insecure practice when not tightly controlled and managed. Furthermore, problems incurred by this credential sharing paradigm are further exacerbated by certain security mechanisms, such as rotating credentials where credentials frequently change.

Current distributed computing systems often can have more than 100,000 managed resources (e.g., virtual machines, servers, network switches, firewalls, load balancers, storage arrays, etc.). To manage and configure these resources, administrators typically use a number of management tools, each of which needs to be authorized for the subset of resources they are intended to manage. Further complicating matters is the fact that the same tool may be used by different administrators to manage different subsets of the resources in the distributed computing system. Consequently, the set of resources associated with any single management tool should be dynamically selected when the system administrator authenticates, to ensure that the proper subset of resources is accessed.

To enhance security of the resources in the distributed computing system, an organization may implement a policy of rotating (e.g., changing) authentication credentials associated with each resource. In many cases this rotation will be implemented automatically, particularly as the number of managed resources increases. Each management client cannot therefore have a copy of all of the credentials as that copy may quickly become invalid. Furthermore, this approach may present certain salient security risks.

Any mechanism intended to enable easy access to resources should also protect against deliberate or inadvertent insecure programming practices. For example, unless proactive steps are taken by the developer of a management client, it may be possible that copies of the credentials will remain in the memory or disk (e.g., swap space) of the computing device on which the management client is executed, even if the administrator has quit the client, thus potentially creating a security exposure. It is also plausible that management clients may be developed by various individuals who may not be familiar with secure coding practices; therefore, the solution to this problem cannot reasonably be presumed to include training of developers. Distributed computing systems continue to grow in the quantity of managed resources and the complexity of relationships between those resources. Any solution to the problem of providing secure access to managed resources to management clients should function properly in an environment where the number of managed resources may exceed 1,000,000.

Conventional techniques have been developed to deal with these problems. One technique, for example, includes using the same credentials on every device. In this case, systems administrators need only remember a single set of credentials to access any resource. This approach, however, is insecure and provides relatively little protection against systems administrators using those credentials to inadvertently or deliberately manage resources for which they have no rights. Another conventional technique has been to implement a credentials vault that provides the credentials for a particular resource to the user when they authenticate against the vault and request the credentials. Nevertheless, this approach is also insecure as the credentials are often provided in clear text form which presents its own inherent security risk. Furthermore, it may be inconvenient for the systems administrator as this technique often requires that he or she needs to authenticate individually against every resource that is to be managed. Yet another conventional technique includes delegating authentication to a proxy service. This addresses the issues related to insecure practices in the other conventional approaches, but a proxy typically supports a relatively limited selection of resources, and in some cases, may be limited to a particular version of the software running on the resource.

FIGS. 1A through 10 illustrate an example distributed resource authorization system 100 according to the teachings of the present disclosure. The system 100 includes a distributed resource authorization computing system 102 having an authorization routing service 104 that includes a client authentication engine 106, a resource authentication engine 108, a client session logging engine 110, a switch matrix 112, and a data source 114. The client authentication engine 106 authenticates a management client 116 to form a client login session 118, while the resource authentication engine 108 authenticates to one or more resources 120 of a distributed computing system 122 to form one or more resource login sessions 124 that are authorized to be managed by the management client 116. The authorization service 104 then establishes a temporary connection between the client login session 118 and the resource login session 124 such that the management client 116 may communicate with the authorized resources 120 using an approach that does not require the client to have knowledge of, or maintain credentials for each resource 120 in the distributed computing system 122.

Figure 1A:
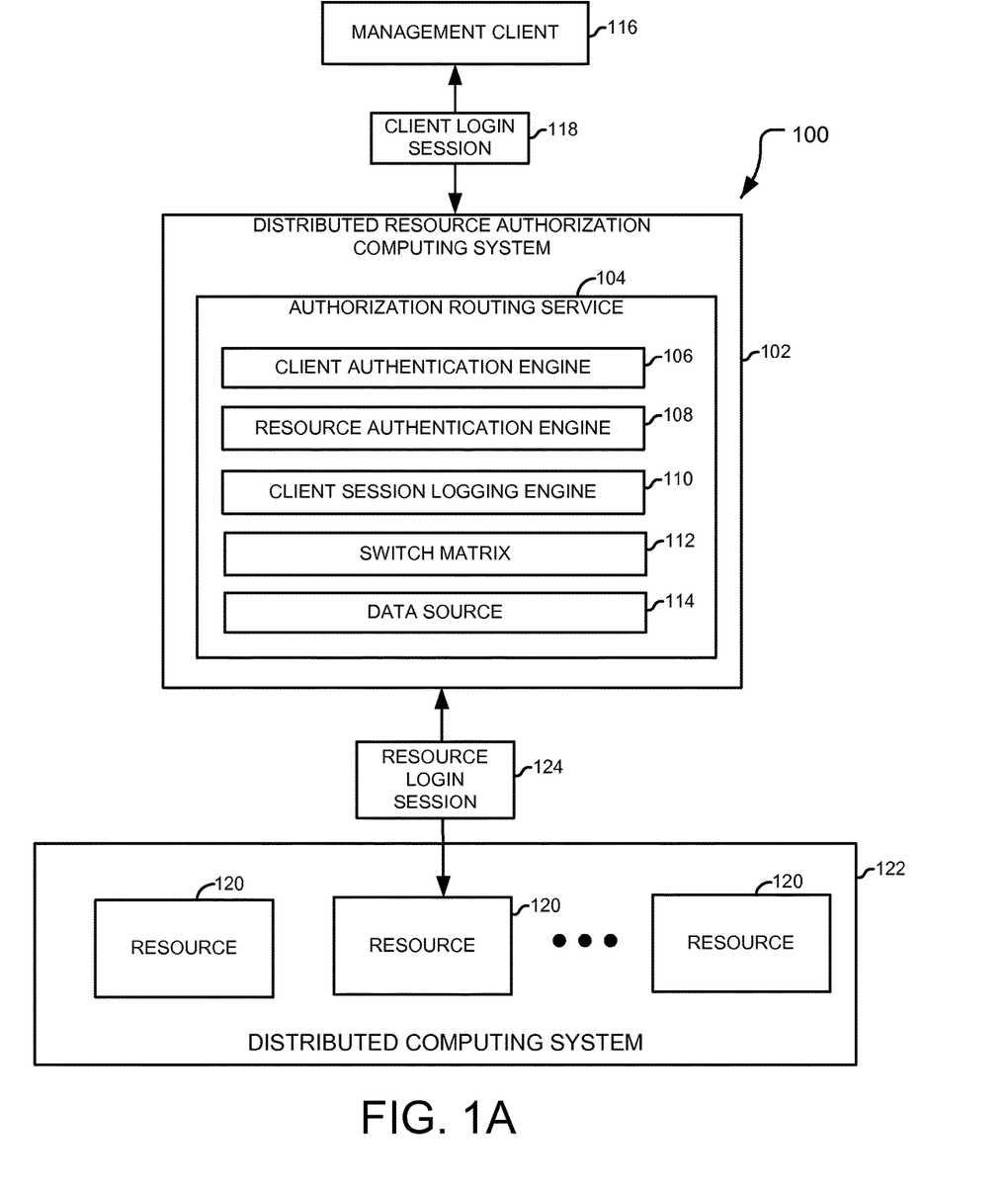
FIG. 1A illustrates an example resource authorization system according to one embodiment of the present disclosure.

The distributed computing system authorization system according to the teachings of the present disclosure provides a scalable solution to enable multiple, disparate management clients 116 to manage those resources of the distributed computing system for which they are authorized to manage. An administrator may input his or her credentials into the management client 116 that uses those credentials to authenticate the client login session 118, which is separate and distinct from any login session established with each resource 120. Upon successful authentication, the authorization service 104 obtains a list of resources from the data source 114 for which the client is authorized to manage. In some cases, the administrator may select a subset of resources based on the task that he or she is intending to address. The management client 116 then attempts to establish a connection to one or more target resources 120. If the target resource is authorized to be managed by the management client 116, then the authorization service 104 obtains login credentials for the requested resource, and authenticates on behalf of the management client 116 to form a resource login session 124. However, if the target resource 120 is not authorized, then the connection request to that target resource 120 is rejected, and may provide the user with the ability to establish a connection with another resource 120. Once the authorization service 104 has established a connection between the management client 116 and the resource 120, any network traffic from the management client 116 is forwarded as-is, to the resource 120, and vice-versa, until the management client 116 or the resource 120 disconnects. As the authorization service 104 passes network traffic unmodified, it can be used to control access to any resource, irrespective of communications protocol.

As the management client 116 has no knowledge of, and is not required to maintain the credentials to the target resource 120, there may be a reduced risk of credentials leaking as a result of poor or inconsistent software development practices. Similarly, credentials for the target resources 120 may be rotated without the management client 116 needing to update its information, thereby allowing credentials to be rotated at a frequent rate if desired.

Connection of the client login session 118 to the resource login session 124 is provided by the switch matrix 112. The switch matrix 112 may include any design that selectively couples one endpoint to another endpoint. In one embodiment, the switch matrix 112 includes a dynamic routing table that is used by the authorization routing service 104 to route packets according to their source and destination addresses. The dynamic routing table may also inhibit unauthorized communication between the client login session 118 and an unauthorized resource by including a null route entry in the routing table for source and/or destination addresses that link the client login session 118 and any unauthorized resource. The authorization routing service 104 may also delete any routing entries between the client login session 118 and the resource login session 124 when either or both login session are terminated.

The client session logging engine 110 generates records for the client login session 118 and stores those records as the client login files 134 in the data source 114, or elsewhere. The log records may include information associated with most or all activity conducted by the management client 116 during each login session, such as any commands issued to each resource, configuration changes made to each resource, and/or any connections generated or dropped using the client login session 118.

Embodiments of the present disclosure may provide one or more advantages over the aforementioned conventional authentication techniques. For example, the system 100 may alleviate the need for credentials to be shared among systems administrators, thus addressing the issue of credentials leakage. The system can be integrated with the process used to rotate credentials, thus enabling ongoing credentials rotation. For example, the system may communicate with a credentials rotating service to receive notification messages each time that credential information for the resources change, and update the resource authentication records 132 so that the system remains in sync with the credential rotating service. Systems administrators may be restricted to defined subsets of the resources, enabling controls to be placed on who can make changes to what resources for a given task. For example, resources may be continually updated by communicating with an operations management system to receive notification messages associated with new resources that are added to each task, and existing resources that are removed from each task. In this manner, systems administrators may need to provide their credentials once to be granted access to all resources necessary to complete their task. Additionally, embodiments of the present disclosure may work with virtually every managed resource in a distributed computing system. For the relatively few resources that require custom authentication, a simple driver may be added to provide authentication services for that custom resource.

The system 100 may provide access for systems administrators to almost any currently existing or yet to be implemented resource without making changes to the authorization service 104. In most cases, the authentication of the client login session 118 or the resource login session 124 may use industry standard protocols (e.g., username/password, certificates, etc.), and the authorization service 104 can use the same, or different authentication approaches for multiple resources. In other cases in which certain resources utilize proprietary authentication mechanisms, a proprietary authentication driver may be included to provide authentication to those resources. Once the authorization service 104 has authenticated the resource, a connection between the management client 116 and the resource 120 is established so that the management client 116 and the resource 120 can seamlessly communicate, as if they were directly connected.

The data source 114 stores client authentication records 128, resource authentication records 130, client/resource correlation records 132, and client login session files 134 for each management client 116 that manages operation of at least one resource 120 in the distributed computing system 122. The client authentication records 128 include information associated with credentials used to authenticate each management client 116, such as a name and password combination or other certificate mechanism to be associated with each management client 116. Likewise, the resource authentication records 130 include information associated with credentials used to authenticate each resource 120 to be managed through the authorization system. The client login session files 134 are generated by the client session logging engine 110 to include logfiles for most or all activity performed during any client login sessions 118 established for each management client 116. The logfiles may include, for example, which resources 120 have been connected to, the time of the connection, and any commands or other control sequences that may have been used to control the operation of each connected resource.

The client/resource correlation records 132 maintain information associated with which resources 120 that are authorized to be managed by each management client 116. Additionally, the client/resource correlation records 132 maintain information about specific commands or other management operations that may be performed by the related management client on that resource. In some cases, the client/resource correlation records 132 may be stored externally to the distributed resource authorization computing system 102. For example, the client/resource correlation records may be provided by an external authentication mechanism, such as a remote authentication dial in user service (RADIUS) server. The resources 120 may also be correlated with each management client 116 according to which resources are consumed by a distributed application 402 implemented on the distributed computing system 122 as will be described below with reference to FIG. 4. Although FIG. 10 shows the Client Authentication Records 128, the Resource Authentication Records 130, the Client/Resource Correlation Records 132, and the Client Log Files 134 as part of the Data Source 114, it can be appreciated that one or more of them may be implemented external to the Data Source 114.

Figure 1B:
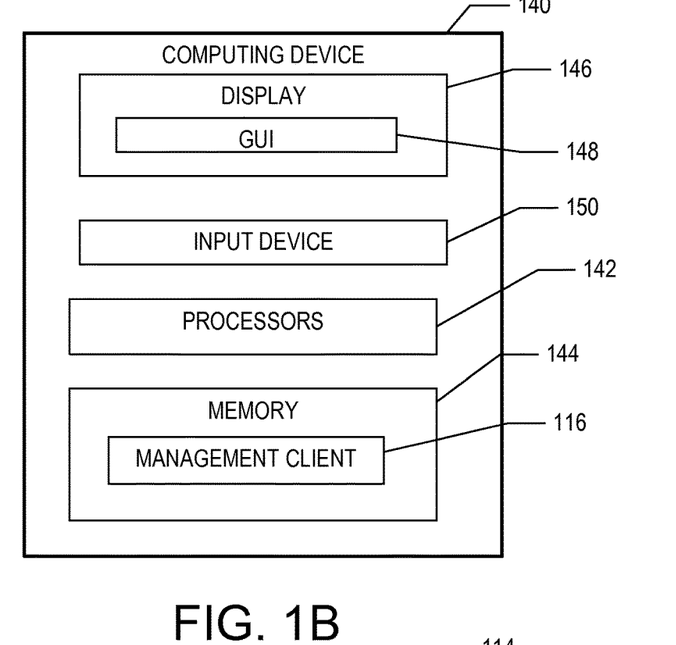
FIG. 1B illustrates an example computing device that may be used to execute the management client according to one embodiment of the present disclosure.
Figure 1C:
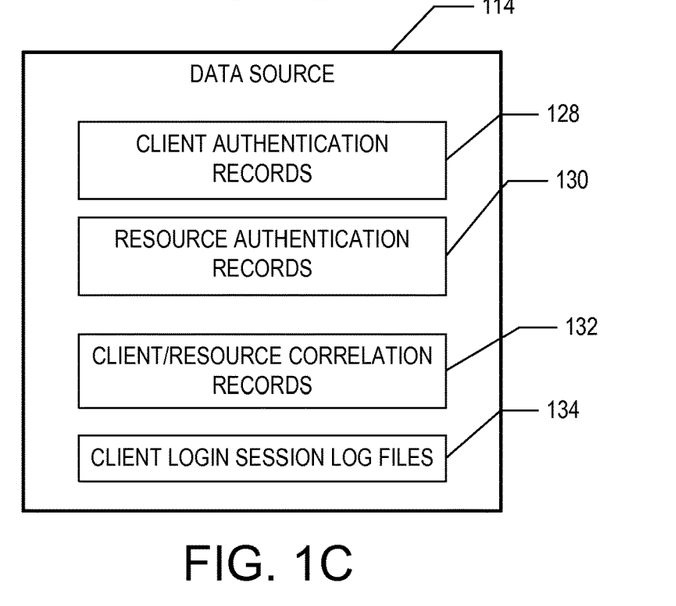
FIG. 1C illustrates an example data source that may be used by the resource authorization system according to one embodiment of the present disclosure.

FIG. 1B depicts an example computing device 140 that may be used to execute the management client 116 according to one embodiment of the present disclosure. The computing device 140 is a computing or processing device that includes one or more processors 142 and memory 144. For example, the computing device 140 can be a personal computer, such as a laptop or notebook computer, a workstation, a server, or other processing device such as a smart phone, or a tablet computer.

The computing device 140 includes a display 146, such as a computer monitor, for displaying data and/or a graphical user interface 148. The computing device 140 also includes an input device 150, such as a keyboard or a pointing device (e.g., a mouse, trackball, pen, or touch screen) to enter data into or interact with the graphical user interface 148. The display 146 may also include a touch-screen device in which input is provided via contact by the user with the touch-screen device.

The computing device 140 receives data and/or communications from, and/or transmits data and/or communications to, the distributed resource authorization computing system 102 via any suitable communication medium, such as a communication network. For example, the management computing system 102 and the distributed computing system 122 communicate with each other using wireless, wired, and/or optical communications. In one embodiment, the distributed resource authorization computing system 102 and the distributed computing system 122 communicates with one another using a communication network, such as the Internet, an intranet, or other wired and/or wireless communication networks. In another embodiment, the distributed resource authorization computing system 102 and distributed computing system 122 communicate with one another using any suitable protocol or messaging scheme. For example, these networks may communicate using a Hypertext Transfer Protocol (HTTP), extensible markup language (XML), extensible hypertext markup language (XHTML), or a Wireless Application Protocol (WAP) protocol. Other examples of communication protocols exist. For example, the distributed resource authorization computing system 102 and distributed computing system 122 may communicate with one another without the use of a separate or a distinct network. Additionally, other embodiments contemplate that the modules employed by the client authentication engine 106 are executed by a computing device configured on the distributed computing system.

The resources 120 of the distributed computing system 122 generally represent hardware resources and/or one or more objects executed on those hardware resources, which may be implemented as applications on a bare-metal operating system, or as virtual objects in a virtual computing environment. The virtual computing environment may be embodied in any computing system that provides virtualized components (virtual objects) executed on one or more physical hosts. Such a computing environment may be provided in whole or in part through a converged infrastructure. (See FIGS. 2A and 2B). Converged infrastructures typically refer to computing systems implemented in a virtual computing environment that includes a structured combination of multiple virtual objects that are executed on independently functioning hardware resources commonly referred to as hosts. Distributed computing systems 200 implemented in a virtual computing environment may be advantageous in that they are dynamically configurable to continually adapt to ever changing requirements typically exhibited by modern distributed computing systems. Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large data center environments, converged infrastructures may involve a pool of server, storage and networking capacities, typically virtualized, that can shared by multiple applications.

In another aspect, the distributed computing system 122 comprises a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments.

Resources 120 of a converged infrastructure may include resources, such as data processing devices, data storage devices, servers, networking equipment, and/or other computing devices. A converged infrastructure includes a combination of these devices that are packaged and interconnected in a standardized manner for ease of maintenance and use. For example, a converged infrastructure 200 such as that shown in FIGS. 2A and 2B includes components found in Vblock™ System infrastructure packages available from VCE, LLC, which is located in Richardson, Tex. Converged infrastructures are often implemented in environments where relatively high reliability and/or availability are desired, such as in an enterprise environment. Nevertheless, it is contemplated that any computing infrastructure, such as a computer cluster, computing grid, blade array, and/or other computing infrastructure may be configured using the teachings of the present disclosure.

Figure 2A:
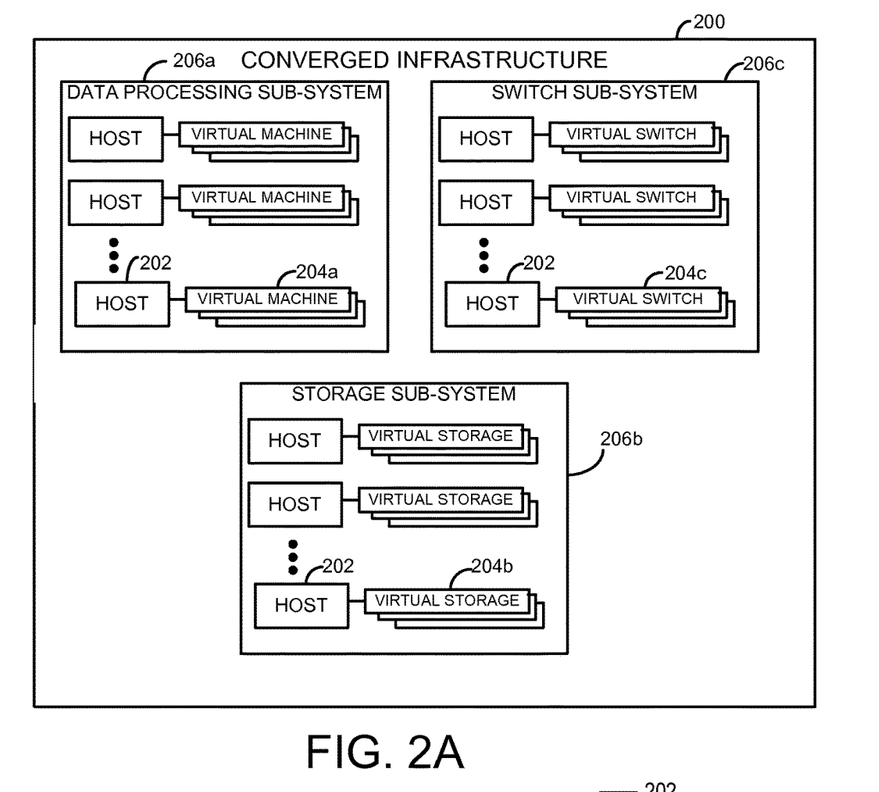
FIGS. 2A and 2B illustrate an example converged infrastructure that may be implemented as a distributed computing system according to one embodiment of the present disclosure.

FIG. 2A illustrates an example converged infrastructure 200 that may be used by the authorization system according to the teachings of the present disclosure. The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that supports the operation of non-virtualized or virtual resources and services provided by those resources. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware corporation, which is located in Palo Alto, Calif.

Figure 2B:
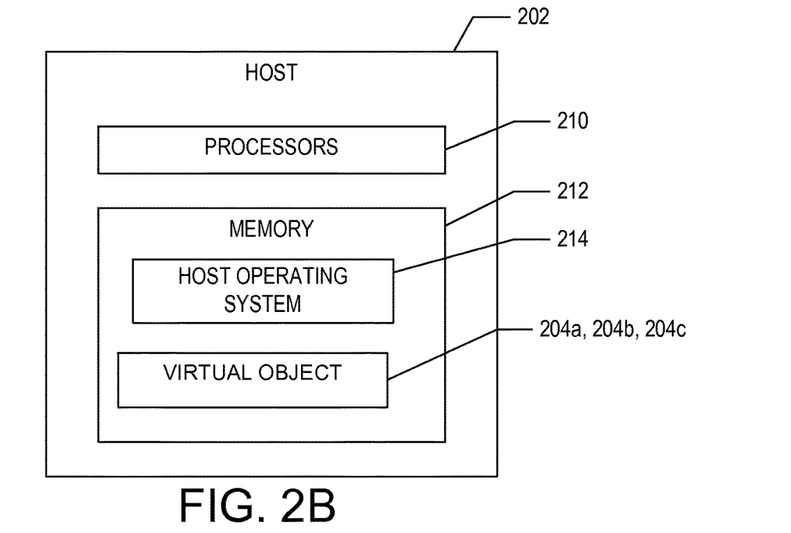

FIG. 2B illustrates an example host 202 implemented on each converged infrastructure 200 according to one aspect of the resource authorization system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 214 controls and manages the operation of the virtual objects executed on the host 202. For example, control signaling for starting, stopping, and/or changing operating parameters of each virtual object is managed through the host operating system 214.

Each of the resources 120 (e.g., VMs 204a, virtual storage objects 204b, and virtual switch objects 204c) as described above may be segregated according to various criteria, such as according to the tasks performed by a group of resources, a tenant who has leased a certain group of resources, or allocation to separate tiers of a multi-tier computing environment, and the like. As such, each segregated group of resources may require combined management, while remaining isolated from other resources that do not form part of that group. Embodiments of the present disclosure provides for management of each group of resources by automatically authenticating resources associated with that group while inhibiting authentication of those resources that are not part of that group using a scheme that automatically authenticate each resource in a group according to a successful authentication process with a client associated with that group.

Figure 3:
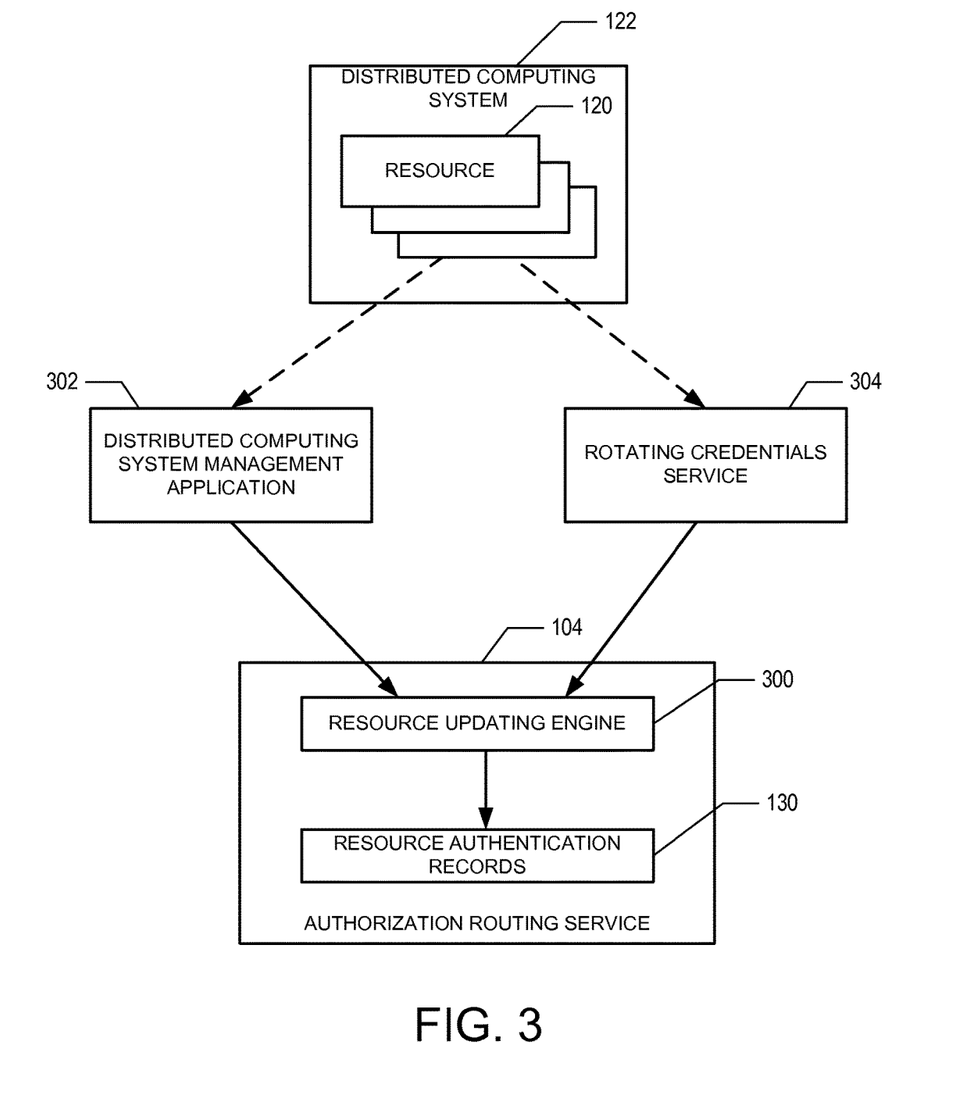
FIG. 3 illustrates an example resource updating engine that may be used to update resource authorization credentials associated with the resources of a distributed computing system according to one embodiment of the present disclosure.

FIG. 3 illustrates an example resource updating engine 300 that may be used to update resource authorization credentials associated with the resources of a distributed computing system according to one embodiment of the present disclosure. The resource updating engine 300 may be provided as a component of the authorization routing service 104 as described above with reference to FIG. 1 and may include the resource authentication records 130 that are described above with reference to FIG. 10. The resource updating engine 300 updates credentials associated with each resource 120 of the distributed computing system 122 according to ongoing changes of the resources in the distributed computing system 122.

The resource updating engine 300 communicates with any entity that may affect and/or control the credentials specified for each resource 120. As shown, the resource updating engine 300 communicates with a distributed computing system management application 302 and/or a rotating credentials service 304 to update credentials for each resource 120 stored in the resource authentication records 130, although any system or resource that affects the credentials of each resource 120 may be used.

The resource updating engine 300 communicates with a distributed computing system management application 302 that manages various activities of the distributed computing system 122. For example, the distributed computing system management application 302 manages the allocation and de-allocation of resources, and may manage the remediation of failures in the system by monitoring the health of each resource and performing corrective measures, such as migration (e.g., failover) of applications to different resources 120 in the event that certain resources 120 have failed. In a particular embodiment in which the distributed computing system 122 is a converged infrastructure, the application 302 comprises a VSPHERE™ software suite that is available from VMware Corporation, which is located in Palo Alto, Calif.

For example, when the distributed computing system management application 302 instantiates new resources 120, destroys existing resources 120, and/or moves resources 120 to differing locations, their credentials may also change. In this case, the distributed computing system management application 302 may transmit notification messages to the resource updating engine 300 each time a resource 120 is modified such that the resource updating engine 300 may modify the credentials associated with that resource 120 in the resource authentication records 130.

The resource updating engine 300 also communicates with a rotating credentials service 304 to ensure that the credentials stored in the resource authentication records 130 remain up-to-date with the credentials established for each resource 120. For example, the rotating credentials service 304 may be configured to update credentials to one, a subset, or all of the resources 120 implemented in the distributed computing system 122 at periodic intervals (e.g., once an hour, day, week, etc.) and/or according to a specified quantity of times that login sessions for each resource has occurred. Each time the rotating credentials service 304 changes credentials for a resource 120, a notification message may be transmitted to the resource updating engine 300 such that the resource updating engine 300 may modify the credentials associated with that resource 120 in the resource authentication records 130.

The distributed computing system management application 302 and rotating credentials service 304 may be executed on one or more processors using executable instructions stored in volatile and/or non-volatile memory for performing the actions and/or steps described herein. For example, the distributed computing system management application 302 and/or the rotating credentials service 304 may be executed on one or more of the resources 120 of the distributed computing system 122 as described above.

Figure 4:
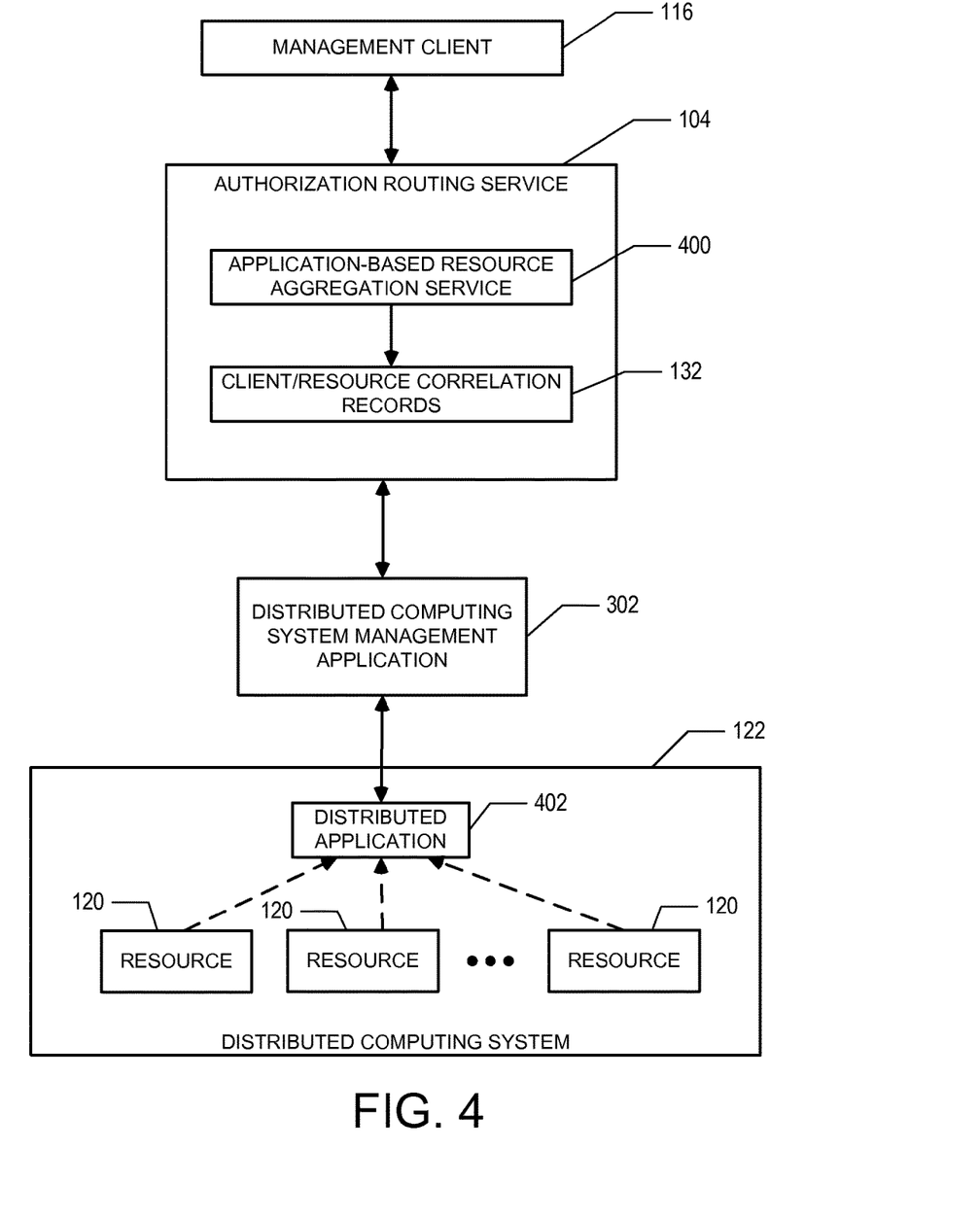
FIG. 4 illustrates an example application-based resource aggregation engine that may be used to update the client/resource correlation records according to one embodiment of the present disclosure.

FIG. 4 illustrates an example application-based resource aggregation engine 400 that may be used to update the client/resource correlation records 132 according to one embodiment of the present disclosure. The application-based resource aggregation engine 400 may be provided as a component of the authorization routing service 104 of FIG. 1A and may include the client/resource correlation records 132 that are described above with reference to FIG. 10. The updates which resources may be authorized for communication by each management client 116 according to which distributed application is consumed by those resources.

The distributed computing system management application 302 manages the operation of one or more distributed applications 402 that are each executed on certain resources 120 of the distributed computing system 122. Examples of such distributed applications may include, for example, an employee vacation booking tool that allows employees of an organization to schedule their vacation time, and a time tracking tool to be used by contractors of the organization. Nevertheless, it should be appreciated that the distributed application 402 may be any type whose operation is distributed over one or more resources of the distributed computing system 122.

The distributed computing system management application 302 may be used to manage how the components of the distributed applications 402 are distributed among the resources 120 of the distributed computing system 122. For example, a management client 116 may communicate with the distributed computing system management application 302 through the authorization system to provide login credentials used to establishing management login session for modifying and/or otherwise manipulating operation of what resources are to be consumed by each distributed application 404. For example, the client authentication records 128 may include a particular record for establishing an employee vacation booking tool management session to form an employee vacation booking tool management domain that authorizes the user to establish login sessions with each resource that executes or provides the vacation booking tool. Additionally, the client authentication records 128 may include an entry for establishing a time tracking tool management session to form a time tracking tool management domain that authorizes the user to establish login sessions with each resource that executes the time tracking tool.

In a particular example, the organization may have two resources 120 allocated as web servers to function as user interfaces for the employee vacation booking tool. The organization has grown over time, however, in that the two web server resources function relatively close to maximum capacity during the working hours of the organization. In this case, an administrator may utilize a management client 116 to establish an employee booking tool login session in which the administrator may be authorized to be logged in to the resources consumed by the employee booking tool application. Using this session, the user may allocate an extra web server resource to be allocated to the employee vacation booking tool application.

When the new web server resource is allocated to the employee booking tool application, the distributed computing system management application 302 may then transmit a notification message to the application-based resource aggregation service 400 that modifies the client/resource correlation record associated with that client to include the added resource in the list of resources that may be authorized to communicate with the employee vacation booking tool application in the client/resource correlation records 132.

Additionally, another administrator or the same administrator may establish another login session to make changes to the resources that are consumed by the time tracking tool. Nevertheless, the login session established using the time tracking tool is prohibited from communicating with or otherwise establishing a connection with any other resources other than those used to execute the time tracking tool while using the time tracking tool login session. Conversely, an administrator logged in via the employee vacation booking tool is prohibited from communicating with or otherwise establishing a connection with any other resources other than those used to execute the employee vacation booking tool application.

Thus as shown, the authorization routing service 104 may be used to authorize a group of resources 120 of a distributed computing system 122 that execute a distributed application using a single login session established from a management client 116. Nevertheless, the authorization routing service 104 may be used to authorize groups of resources associated with other aspects of the distributed computing system 122. For example, the authorization system 100 may be used to authorize a group of resources 120 according to one or more users (e.g., tenants) that have been allocated those resources according to a contractual agreement.

Figure 5:
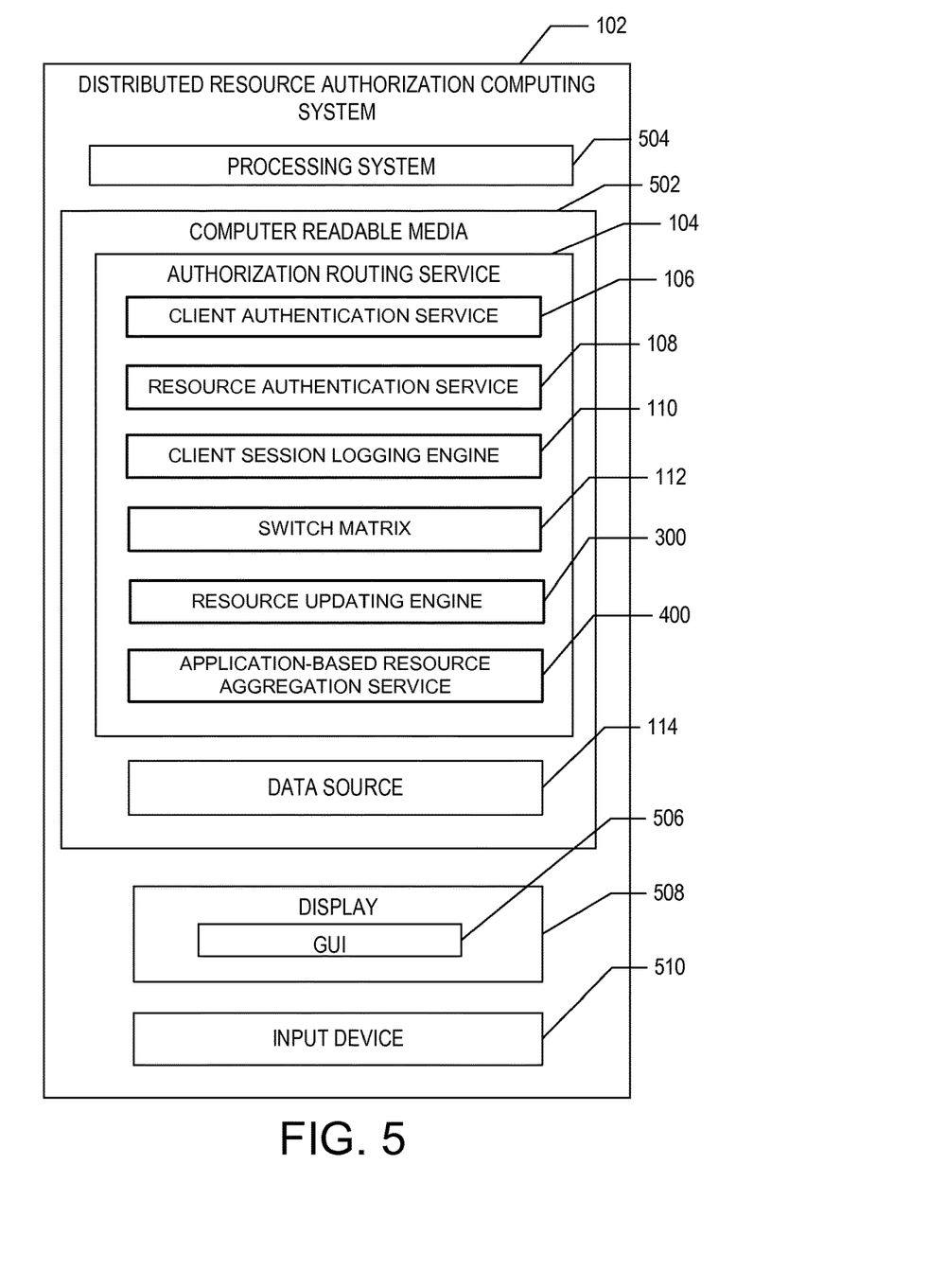
FIG. 5 illustrates a block diagram of an example authorization routing service executed on the resource authorization computing system according to one embodiment of the present disclosure.

Referring now in more detail to FIG. 5, an example distributed computing system resource authorization computing system 102, is depicted according to one aspect of the present disclosure. The distributed computing system resource authorization computing system 102 includes a computer readable media (e.g., memory) 502 that stores the various components of the authorization routing service 104 (e.g., the client authentication engine 106, the resource authentication engine 108, the client session logging service 108, the switch matrix 112, the resource updating engine 300, and the application-based resource aggregation service 400) and executed by a processing system 504. The management computing system 102 may include any type of computing system, such as one or more management computing systems, personal computers, mobile computers and/or other mobile devices, and other hosts. For example, the authorization system could run as a separate and distinct computing device (e.g., bare metal instance), or as a virtual machine alongside other management applications. Additionally, multiple authorization system instances could be executed in parallel for increased throughput, if necessary. In one embodiment, the authorization system includes one or more services running in the distributed computing system on the management network.

According to one aspect, the distributed resource authorization management computing system 102 also includes a graphical user interface (GUI) 506 displayed on the display 510, such as a computer monitor, for displaying data. The distributed file system management computing system 102 also includes an input device 510, such as a keyboard or a pointing device (e.g., a mouse, trackball, pen, or touch screen) to enter data into or interact with the GUI 506.

The computer readable media 502 includes volatile media, nonvolatile media, removable media, non-removable media, and/or another available medium. By way of example and not limitation, non-transitory computer readable medium comprises computer storage media, such as non-transient storage memory, volatile media, nonvolatile media, removable media, and/or non-removable media implemented in a method or technology for storage of information, such as computer readable instructions, data structures, program modules, or other data.

It should be appreciated that the client authentication engine 106, the resource authentication engine 108, the client session logging service 108, the switch matrix 112, the resource updating engine 304, and the application-based resource aggregation service 402 described herein are provided only as examples, and that the authorization system may have different components, additional components, or fewer components than those described herein. For example, one or more components may be combined into a single component. As another example, certain components described herein may be encoded on, and executed on other computing systems, such as on one of the hosts 202 of a converged infrastructure 200 as described above with reference to FIGS. 2A and 2B.

Figure 6:
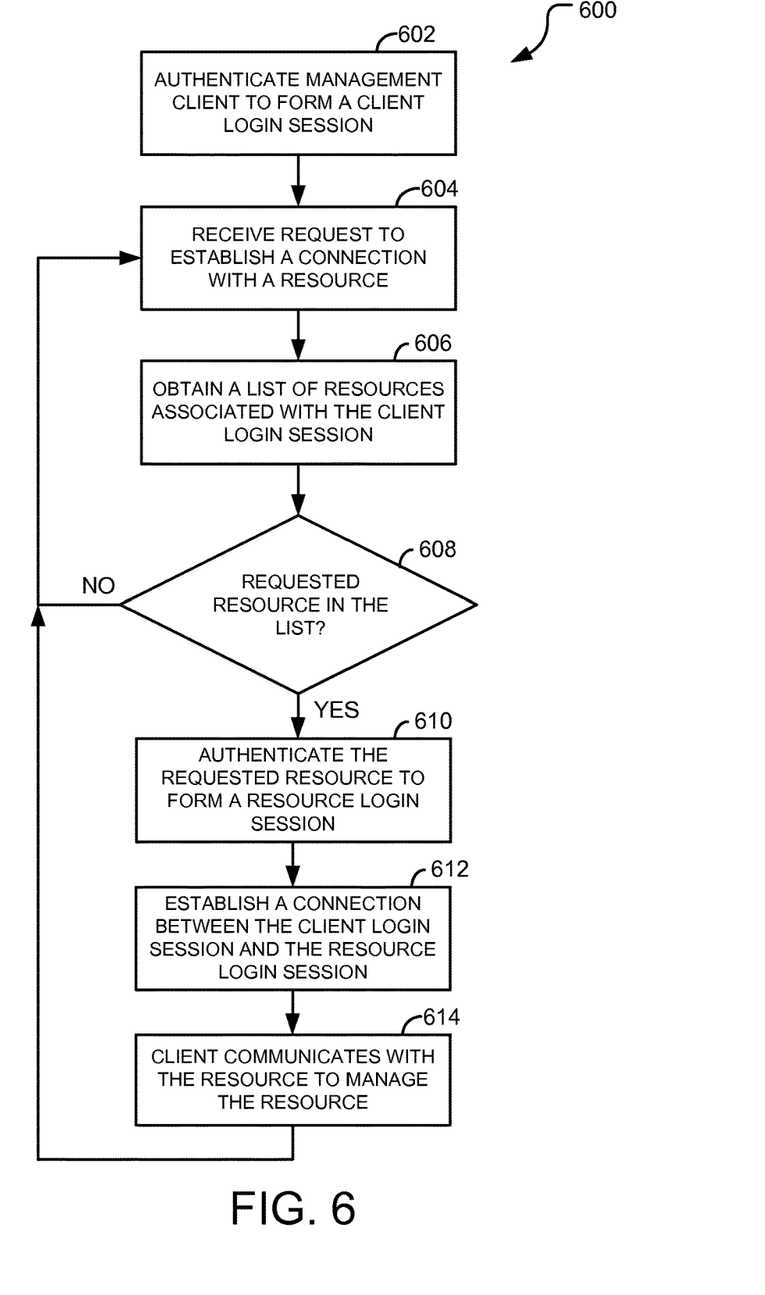
FIG. 6 illustrates an example process that is performed by the authorization routing service to authorize communication of one or more resources of a distributed computing system with a management client according to one embodiment of the present disclosure.

FIG. 6 illustrates an example process 600 that is performed by the authorization routing service 104 to authorize communication of one or more resources of a distributed computing system with a management client according to one embodiment of the present disclosure.

In step 602, the authorization routing service 104, using the client authentication engine 106, authenticates a management client 116 to form a client login session. Thereafter, the management client 116 may then transmit a request to the authorization routing service 104 to establish a connection to a resource in step 604.

In step 606, the authorization routing service 104 obtains a list of resources that the client login session is authorized to communicate with. For example, the list of resources may be stored in the memory of the authorization routing service 104 as one or more client/resource correlation records 132. In one embodiment, the list of resources may be based upon a distributed application 402 that consumes multiple resources of a distributed computing system. In another embodiment, the authorization routing service 104 may continually update the list of resources as those resources that support the distributed application are added, removed, and/or modified.

In step 608, the authorization routing service 104 determines whether or not the resource requested by the management client 116 in step 604 is included in the list of resources obtained in step 606. If not, the request is rejected in which processing continues at step 604 to receive and process requests to form a connection with another resource. If, however, the requested resource is included in the list of resources, processing continues at step 610.

At step 610, the authorization routing service 104, using the resource authentication engine 108, authenticates the requested resource to form a resource login session 124. It is important to note that the resource login session is authenticated independently of the client login session. In this manner, the management client 116 is not burdened with providing the credential necessary for establishing the resource login session, which may be particularly useful when used with distributed computing systems that may have relatively large quantities of resources whose credentials may change often. For example, authorization routing service 104 may include a resource updating service 300 that automatically updates credentials for each resource that are stored in the memory of the authorization routing service 104 such that credentials associated with each resource remain up-to-date.

At step 612, the authorization routing service 104 establishes a connection between the management client and the requested resource by communicatively coupling the client login session 118 and the resource login session 124. In one embodiment, the authorization system communicatively couples the client login session 118 and the resource login session 124 using a switch matrix, which may be, for example, a routing table that routes packets between the client login session and the resource login session. The routing table may be transparent in that it routes packets regardless of any protocol associated with the routed packets. In this manner, the management client 116 may utilize any suitable management tool or service to control and/or otherwise manipulate operation of the connected resource.

At step 614, the authorization routing service 104 forwards communication traffic between the management client 116 and the authenticated resource 120. In one embodiment, the authorization routing service 104 provides no limitation on what requests may be made by the management client 116 to each resource 120. That is, the management client may have full control over how the resource is configured. In another embodiment, the authorization routing service 104 may maintain multiple sets of credentials for a given resource, each with a different set of authorized commands and/or configuration settings that may be allowed for that management client 116. The credentials provided by the client when it authenticates against the authentication service 104 are used to request the appropriate set of resource credentials from the client/resource correlation records 132, to control or limit the scope of authorized actions. In this manner, the authorization routing service 104 may provide a relatively fine-grained level of control over the authorized actions by a client, without needing to interpret the management traffic.

Thereafter, processing continues at step 604 to establish connections to other resources requested by the management client. Nevertheless, when use of the client authentication engine 106 is no longer needed or desired, the process ends.

Although FIG. 6 describes one example of a process that may be performed by the authorization routing service 104 to establish connections for resources in a distributed computing system, the features of the disclosed process may be embodied in other specific forms without deviating from the spirit and scope of the present disclosure. For example, the client authentication engine 106 may perform additional, fewer, or different operations than those operations as described in the present example. As another example, the steps of the process described herein may be performed by a computing system other than the computing system 102, which may be, for example, one of the virtual objects executed on the distributed computing system. For yet another example, deleting the connection between the management client and the requested resource may be accomplished by reversing the afore-described process, in which the client login session and resource login session is deleted, followed by removing the connection for the connection in the switch matrix of the authorization routing service 104.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 7:
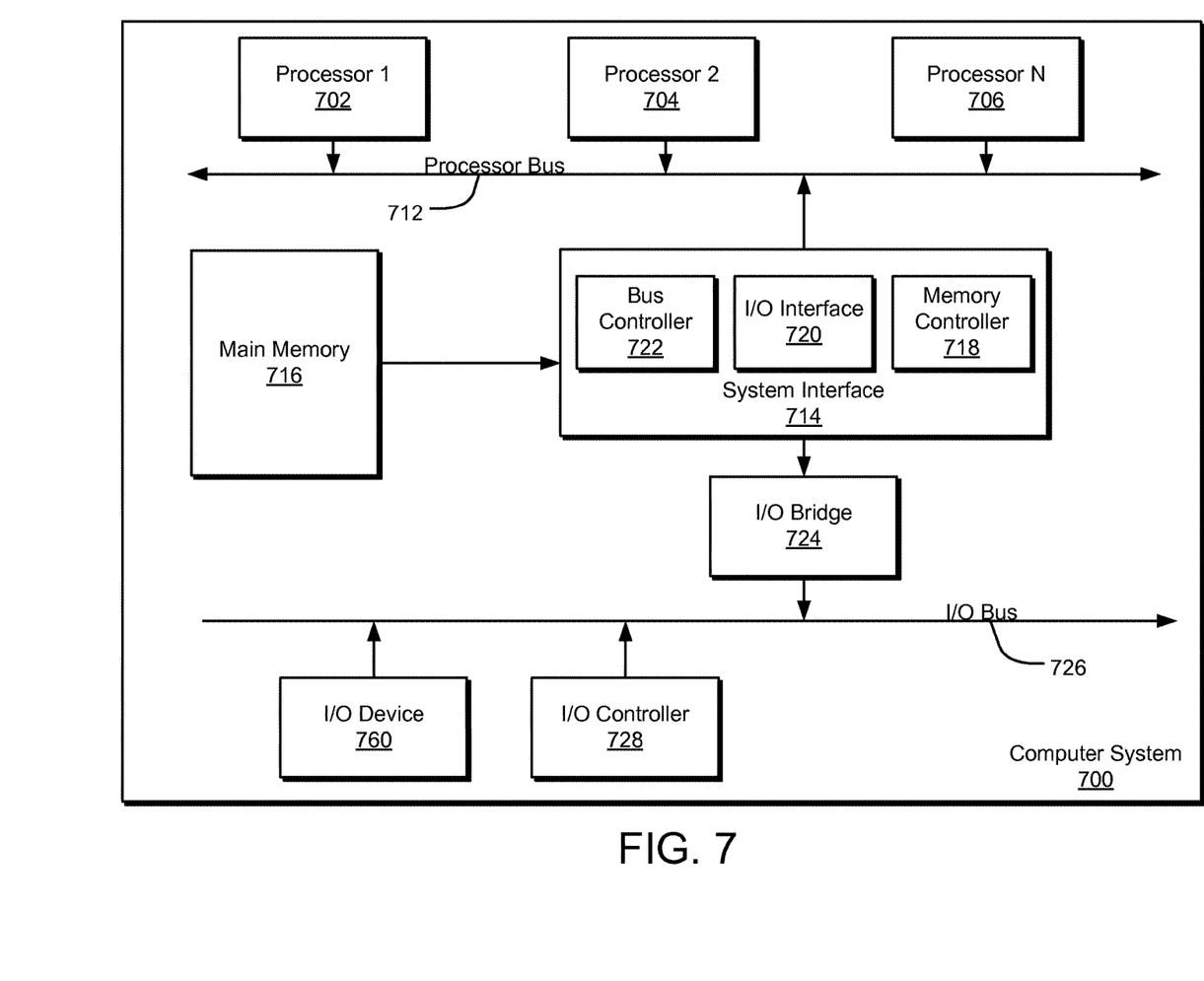
FIG. 7 illustrates an example computer system according to one embodiment of the present disclosure.

For example, FIG. 7 is a block diagram illustrating an example of a host or computer system 700 which may be used in implementing the embodiments of the present disclosure. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 713 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 760, as illustrated.

I/O device 760 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 716. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A resource authorization method comprising:
    authenticating, using instructions stored in a non-transitory medium and executed on at least one processor, a client to form a client login session;
    receiving, using the instructions executed by the processor, a request to establish a plurality of connections between the client and a plurality of target resources that are used to execute a distributed application, the plurality of target resources being configured in a distributed computing system;
    obtaining, using the instructions executed by the processor, a list indicating one or more authorized resources that the client is authorized to manage in the distributed computing system;
    authenticating, using the instructions executed by the processor, the plurality of target resources to form a plurality of resource login sessions, wherein authenticating each target resource comprises:
        determining, based at least in part on the obtained list, that the client is authorized to manage the target resource;
        in response to determining that the client is authorized, retrieving an authentication credential for the target resource; and
        authenticating the target resource, using the retrieved authentication credential, to form a resource login session with the target resource, wherein the resource login session is established independently of the client login session; and
    establishing, using the instructions executed by the processor, the plurality of requested connections between the client and the target resources by using a switch matrix to communicatively couple the client login session to one or more of the resource login sessions such that network traffic between the client and the target resources is forwarded irrespective of any particular communication protocol;
    wherein using the switch matrix to communicatively couple the client login session to one or more of the resource login sessions further comprises using a dynamic routing table.

2. The resource authorization method of claim 1, further comprising updating the list when at least one of an additional resource is allocated to be used by the distributed application, an existing resource is de-allocated from use by the distributed application, or an existing resource is modified.

3. The resource authorization method of claim 1, further comprising updating credential information associated with at least one of the resources when the credential information is modified using a rotating credential service.

4. The resource authorization method of claim 1, further comprising restricting the client login session from connecting to another resource when the other resource is not in the list.

5. The resource authorization method of claim 1, further comprising generating a session logfile for the client login session.

6. The resource authorization method of claim 1, further comprising obtaining the list from an at least one memory, the memory communicatively coupled with one or more of the client and the at least one processor.

7. The resource authorization method of claim 1, further comprising obtaining the list from a credentials server that executes other instructions external to the instructions.

8. A resource authorization system for a distributed computing system, the resource authorization system comprising:
- a computing system in communication with a client computing device and a distributed computing system, the computing system comprising at least one processor and at least one memory to store instructions that, when executed by the at least one processor, are configured to:
  - authenticate a client to form a client login session;
  - receive a request to establish a plurality of connections between the client and a plurality of target resources that are used to execute a distributed application, the plurality of target resources being configured in a distributed computing system;
  - obtain a list indicating one or more authorized resources that the client is authorized to manage in the distributed computing system;
  - authenticate the plurality of target resources to form a plurality of resource login sessions, wherein authenticating each target resource comprises:
    - determining, based at least in part on the obtained list, that the client is authorized to manage the target resource;
    - in response to determining that the client is authorized,
    - retrieving an application credential for the target resource; and
    - authenticating the target resource, using the retrieved authentication credential, to form a resource login session with the target resource, wherein the resource login session is established independently of the client login session; and
  - establish the plurality of requested connections between the client and the target resources by using a switch matrix to communicatively couple the client login session to one or more of the resource login sessions such that network traffic between the client and the target resources is forwarded irrespective of any particular communication protocol;
  - wherein the instructions are configured to communicatively couple the client login session to the resource login session using a routing table.

9. The resource authorization system of claim 8, wherein the instructions are configured to update the list when at least one of an additional resource is allocated to be used by the distributed application, an existing resource is de-allocated from use by the distributed application, or an existing resource is modified.

10. The resource authorization system of claim 8, wherein the instructions are configured to update credential information associated with at least one of the resources when the credential information is modified using a rotating credential service.

11. The resource authorization system of claim 8, wherein the instructions are configured to restrict the client login session from connecting to another resource when the other resource is not in the list.

12. The resource authorization system of claim 8, wherein the instructions are configured to generate a session logfile for the client login session.

13. The resource authorization system of claim 8, wherein the instructions are configured to obtain the list from the at least one memory.

14. The resource authorization system of claim 8, wherein the instructions are configured to obtain the list from a credentials server that executes other instructions external to the resource authorization system.

15. A non-transitory, computer readable medium including computer executable instructions that, when executed by at least one processor, are configured to perform at least the following:
- receive a request to establish a plurality of connections from an authenticated client login session to a plurality of target resources that are used to execute a distributed application, the plurality of target resources being configured in a distributed computing system;
- obtain a list indicating one or more authorized resources that the client login session is authorized to manage in the distributed computing system;
- authenticate the plurality of target resources to form a plurality of resource login sessions, wherein authenticating each target resource comprises:
  - determining that the client is authorized to manage the target resource;
  - retrieving an authentication credential for the target resource; and
  - authenticating the target resource, using the retrieved authentication credential, to thereby form a resource login session with the target resource, such that the resource login session is established independently of the client login session;
- establish the plurality of requested connections by communicatively coupling the client login session and each one of the plurality of resource login sessions, the connections forwarding network traffic between a client of the authenticated client login session and the plurality of resources irrespective of any particular communication protocol, at least one of the connections established by using a switch matrix; and
- communicatively couple the client login session to the resource login session using a routing table.

* * * * *